(12) United States Patent
Seewald et al.

(10) Patent No.: US 9,453,605 B2
(45) Date of Patent: Sep. 27, 2016

(54) INJECTION COOLER

(71) Applicant: TEC artec GmbH, Oranienburg (DE)

(72) Inventors: Gerhard Seewald, Oranienburg (DE); Kay Fugmann, Schildow (DE)

(73) Assignee: AVK Holding A/S, Galten (DK)

( * ) Notice: Subject to any disclaimer, the term of this patent is extended or adjusted under 35 U.S.C. 154(b) by 89 days.

(21) Appl. No.: 14/353,874

(22) PCT Filed: Oct. 24, 2012

(86) PCT No.: PCT/EP2012/071090
§ 371 (c)(1),
(2) Date: Apr. 24, 2014

(87) PCT Pub. No.: WO2013/060748
PCT Pub. Date: May 2, 2013

(65) Prior Publication Data
US 2014/0290755 A1 Oct. 2, 2014

(30) Foreign Application Priority Data

Oct. 25, 2011 (DE) .......................... 10 2011 054 793

(51) Int. Cl.
*B01F 5/04* (2006.01)
*F16L 53/00* (2006.01)
(Continued)

(52) U.S. Cl.
CPC .............. *F16L 53/00* (2013.01); *B05B 1/1672* (2013.01); *B05B 7/0075* (2013.01); *F22G 5/123* (2013.01); *B05B 1/3447* (2013.01); *Y10T 137/6416* (2015.04)

(58) Field of Classification Search
CPC . B05B 7/0075; B05B 1/1672; B05B 1/3447; F22G 5/123; F16L 53/00; Y10T 137/6416
USPC ......................................................... 137/888
See application file for complete search history.

(56) References Cited

U.S. PATENT DOCUMENTS 759,832 A * 5/1904 Simpson ................... F22G 7/10
122/470
1,041,798 A * 10/1912 Hunter .................. B05B 1/3447
239/488

(Continued)

FOREIGN PATENT DOCUMENTS

DE 18 62 826 11/1962
DE 244 32 07 7/1976
(Continued)

*Primary Examiner* — John K Fristoe, Jr.
*Assistant Examiner* — Unashankar Venkatesan
(74) *Attorney, Agent, or Firm* — Clark & Brody

(57) ABSTRACT

An injection cooler for cooling hot steam in a pipeline has an injecting device that has multiple injection nozzles. The cooler includes a regulating body connected to a coolant supply. The regulating body is equipped with a valve arrangement to regulate coolant feed to the injection nozzles. Coolant feed lines are provided between the injecting device and the regulating body with a separate coolant feed line being provided for each injection nozzle. Ends of the coolant feed lines of the injecting device are secured to a first flange plate which can be secured to a surface on the injecting device. Ends of the coolant feed lines associated with the regulating body are secured to a second flange plate which is secured to a receiving surface of the regulating body. The injecting device has a tubular mixing portion with a de Laval nozzle-type longitudinal section along a longitudinal axis.

10 Claims, 7 Drawing Sheets

(51) Int. Cl.
*F22G 5/12* (2006.01)
*B05B 1/16* (2006.01)
*B05B 7/00* (2006.01)
*B05B 1/34* (2006.01)

(56) References Cited

U.S. PATENT DOCUMENTS 5,385,121 A * 1/1995 Feiss ............... F22G 5/123
122/459

6,595,163 B2  7/2003 Dumaz et al.

FOREIGN PATENT DOCUMENTS

| | | |
|---|---|---|
| DE | 85 33 682 | 1/1986 |
| DE | 43 17 241 | 12/1994 |
| DE | 20 2010 009 860 | 10/2011 |
| EP | 0 682 462 | 11/1995 |
| FR | 1 196 969 | 11/1959 |
| NL | 9 301 125 | 1/1995 |
| WO | 94/17330 | 8/1994 |

* cited by examiner

INJECTION COOLER

The invention relates to an injection cooler as per the preamble of claim 1.

Installations that operate with steam as an energy source, for example power generation installations or combined heat and power plants, are normally configured such that the steam that is used must be at a certain temperature and a certain pressure at the destination. However, the steam generated by the steam boiler is normally initially superheated, such that it must be cooled to a lower temperature. For this purpose, use is made of so-called injection coolers which are inserted directly into the pipeline and which inject a coolant, for example water, into the steam flow. The injected water is atomized owing to the pressure difference between the water and the steam in the pipeline. Said water evaporates and is superheated, whereas the steam itself cools down.

Known injection coolers are normally composed of a housing with a feed for the cooling water and with an injection cylinder which projects into the pipeline and which bears multiple injection nozzles arranged adjacent one another. In the housing there is guided a regulating spindle which is mounted with one end in the injection cylinder connected to the housing and which, there, bears a perforated cone in the region of the injection nozzles. The spindle is driven as a function of the temperature in the pipeline. Here, said spindle performs a stroke movement. The stroke position, corresponding to a regulator signal, opens up a certain control cross section in the perforated cone for the admission of the cooling water into the cylinder. At the same time, regulating bores to the nozzle chambers in the injection nozzles are opened up, whereby the water passes into the steam flow.

EP 0 682 762 B1 likewise uses a stroke system for the control of the cooling water flow rate, specifically a piston rod which is guided axially in a hollow cylindrical cooling water line arranged between a water inlet opening and the injection nozzles. The piston rod bears, on an end within a nozzle head, a regulating piston which opens up or blocks the injection nozzles in a position-dependent manner.

Such injection coolers have the disadvantage that regular pistons during their movement can only open up the nozzle openings in succession owing to their respectively implemented linear arrangement, that is to say the injection nozzles can only ever be activated from top to bottom or from bottom to top in a fixed sequence, which, within the pipeline, has an adverse effect on the water distribution and thus has an adverse effect on the cooling of the hot steam. Moreover, the seals and guide elements of the piston and of the spindle are subject to very high loading owing to the normally very high line pressure of 20 bar to over 300 bar, such that the service life of the injection cooler is limited. This results in short maintenance intervals, and operating costs are very high.

To achieve a longer service life of the seals and guide elements of the injection cooler DE 85 33 682 U1 proposes that the regulating spindle or the piston rod performs not a stroke movement but rather a rotational movement. This firstly has the effect that a change in the regulating cross sections of the injection nozzles is realized by means of a tangential movement. Secondly, the injection nozzles, which are normally arranged in the longitudinal direction of the injection cylinder, can be opened and closed symmetrically around a centrally arranged injection nozzle, which has an expedient effect on the distribution of the cooling water in the pipeline. Furthermore, the pivoting piston has an expedient effect on the structural size of the injection cooler, because the spindle or the piston rod no longer needs to travel out of the housing.

A problem here is however the fact that all of the moving parts of the injection cooler remain situated in the injection cylinder, which is subject to extreme loads within the pipeline, in particular when, in relatively new installations, the steam temperatures are over 600° C. and the cooling water pressure is over 300 bar. The wear to the injection cooler is thus very high, and cumbersome maintenance and repair work must be performed at regular intervals.

To counteract this, NL 93 01 125 A1 proposes that the injection nozzles of the injection cylinder be situated within the pipeline, whereas the regulating element with its valve arrangement is arranged, spaced apart therefrom, outside the pipeline. The regulating element and the injection nozzles are thus spatially separate from one another and the regulating element is no longer subject to the extreme conditions within the pipeline.

For the supply of cooling water to the injection nozzles, provision is made, in NL 93 01 125 A1, of a dedicated water line for each nozzle, which water line is arranged between the regulating element and the injection cylinder. Within the injection cylinder there are formed ducts which conduct the cooling water from an associated water line to the respectively associated injection nozzle. Within the regulating element there is provided a piston rod which, in a cylindrical chamber, bears a regulating piston. Said regulating piston—in a manner dependent on stroke position—opens up the individual water lines that lead to the injection nozzles.

It is thus duly the case that, within the pipeline, there are no longer any moving elements present in the injection cylinder. It is however a disadvantage here that all of the cooling water lines must be connected individually to the regulating element and to the injection cylinder, which is correspondingly cumbersome and expensive.

It is also a problem that the water lines and thus also the injection nozzles can only ever be opened up in succession in a predefined sequence owing to the stroke movement of the piston, which leads to a non-uniform cooling water distribution within the pipeline. Moreover, the stroke piston must always act counter to the steam pressure prevailing in the pipeline, such that a relief bore is required in the connector head of the regulating element. When all of the feed lines are closed, there is consequently always the risk, owing to the high water pressure, of water dripping from the injection nozzles into the pipeline, which has an adverse effect on precise regulation of the steam temperature.

A further disadvantage of the known injection coolers consists in that the coolant which is introduced into the pipeline via the injection nozzles is often not adequately finely atomized. Instead, it is normally the case that only relatively large droplets are formed. A uniform distribution of the cooling water over the entire cross-sectional area of the pipeline is either not realized at all or is not realized rapidly enough. All of this reduces the effectiveness of the injection cooler and can furthermore result in a non-uniform temperature distribution of the steam in the pipeline.

It is the aim of the invention to eliminate these and other disadvantages of the prior art and to provide an improved injection cooler which, with simple means, is of inexpensive construction and is easy to handle. The task is to seek a simple and rapid installation and dismounting device. Furthermore, the injection cooler should have a long service life and should ensure optimum atomization of the cooling water and a rapid and uniform distribution of cooling water over the entire pipeline cross section.

In the case of an injection cooler for cooling hot steam conducted in a flow direction in a pipeline, having an injection device which can be connected to the pipeline and which has multiple injection nozzles, having a regulating element that can be connected by way of a connector to a coolant supply, wherein, in the regulating element, there is arranged a valve arrangement by means of which the coolant feed to the injection nozzles of the injection device can be regulated, and having coolant feed lines that are provided between the injection device and the regulating element, wherein a separate coolant feed line is provided for each injection nozzle, it is provided according to the invention that those ends of the coolant feed lines that are associated with the injection device are fastened to a common first flange plate which can be fixed to a mounting surface on the injection device, and that those ends of the coolant feed lines that are associated with the regulating element are fastened to a common second flange plate which can be fixed to a mounting surface of the regulating element, and that the injection device has a tubular intermixing section which can be connected to the pipeline, wherein the intermixing section has a Laval-nozzle-like longitudinal section along a longitudinal axis.

The coolant feed lines which, in the case of an injection cooler according to the invention, are provided between the injection device and the regulating element firstly ensure that the regulating element can be arranged spaced apart from the injection device and thus outside the steam line. This considerably reduces the occurrence of loading-induced malfunctions of the regulating element and thus has an advantageous effect on the repair costs and the service life of the injection cooler.

The flange plates, provided according to the invention, of the coolant feed lines permit simple and also rapid installation of the injection cooler, because those ends of the coolant feed lines that are fastened in each case to a flange plate are connected to the injection device or to the regulating element jointly in only one installation step. By contrast to the previously known solutions, the lines consequently need no longer be individually screwed and sealed onto the injection device or the regulating element. Instead, this is performed in grouped fashion, which not only considerably reduces the amount of work involved but also considerably reduces the risk of leaks and installation errors.

The intermixing section of the injection device, which provides a Laval-nozzle-like narrowing and widening, yields a flow profile which ensures that the coolant introduced via the injection nozzles in said section is distributed rapidly and uniformly over the entire pipe cross section. At the same time, the coolant that is introduced is additionally atomized in the intermixing section, whereby a small droplet size of the coolant is achieved. This permits extremely efficient and uniform cooling of the hot steam by means of the finely distributed coolant.

A further advantage of the injection cooler according to the invention consists in that it can be broken down quickly and easily into individual components when required. Thus, for example, by simply dismounting a flange plate, multiple cooling water feed lines are dismounted at once, which has an expedient effect on installation and maintenance costs. Furthermore, it is possible for the injection cooler to be of modular construction and for both the injection device and the regulating element, and also the coolant feed lines that are grouped together on both sides by means of the flange plates, to be formed as preassembled structural units. Accordingly, the invention provides that the coolant feed lines and the flange plates form a flange assembly. A preferred refinement of the invention comprises that the injection nozzles are arranged in the intermixing section. In this way, the coolant is finely atomized and uniformly distributed promptly after being introduced into the intermixing section. It is preferable for the injection nozzles to be arranged in the region of a conical or funnel-shaped widening of the Laval-nozzle-like intermixing section. It is specifically in this region, owing to the flow profile of the conducted hot steam realized owing to the Laval-nozzle-like form of the intermixing section, that fine atomization of the contained liquid and effective intermixing of all of the entrained components takes place. Therefore, in the case of an arrangement in the region of the widening, the introduced coolant is finely atomized and uniformly distributed immediately after being introduced without any delay, and therefore directly effects highly efficient and rapid cooling of the hot steam.

It is also conceivable for the injection nozzles to be arranged upstream of the Laval-nozzle-like region of the intermixing section. In this case, the coolant is initially introduced into a region of the intermixing section which is positioned upstream of the Laval-nozzle-like region before then being further atomized and distributed downstream in the Laval-nozzle-like region.

The coolant feed to the injection device is realized by means of the coolant feed lines and is controlled by means of the regulating element. One important embodiment consequently provides that the injection device comprises multiple nozzle inlet lines which are each connected to an associated injection nozzle. A separate supply to and separate control of different injection nozzles is likewise possible by means of the individual nozzle inlet lines.

To make the injection of the coolant as simple as possible, it is preferable for each injection nozzle to have a nozzle opening, which nozzle opening is arranged such that the coolant can be introduced into the intermixing section substantially radially and in the flow direction. For particularly efficient atomization of the coolant, it may furthermore be advantageous for a swirl or mixing insert to be arranged upstream of each nozzle opening.

It is furthermore provided that the injection nozzles and/or the associated nozzle inlet line are arranged, at least in sections, in a wall of the intermixing section. Advantages of this are in particular the robust and compact construction. This applies in particular to embodiments in which the injection nozzles and/or the nozzle inlet line are integrated entirely in the pipe wall. For example, the nozzle inlet line may be formed by a duct in the pipe wall. In this case, it is expedient for the mounting surface for the flange plate of the coolant feed lines to also be formed on an outer surface of the tubular intermixing section. This yields an altogether compact construction of the injection cooler, in particular of the injection device.

It is however also conceivable for the nozzle inlet lines and/or the injection nozzles to at least partially project out of the pipe wall. Here, the nozzle inlet lines are formed as separate pipelines, wherein, in this case too, the mounting means with the mounting surface for the flange plate of the coolant feed lines is formed separately from the intermixing section.

If required, the injection nozzles may also partially project into an interior space of the tubular intermixing section.

A further important refinement provides that at least two injection nozzles are arranged, spaced apart from one another in the circumferential direction, on or in the intermixing section. In this way, the injection nozzles can be distributed uniformly over the circumference of the tubular intermixing section. If for example four injection nozzles are provided in a region, these may for example be arranged offset by 90° in each case.

The injection device preferably has a mounting means on which the support surface for the first flange plate is formed. The flange plate and the coolant feed lines fastened thereto are consequently installed on the mounting means. It is expedient for the mounting means of the injection device to be of angular form, for example square, rectangular or polygonal, in cross section in the region of the mounting surface for the first flange plate. The flange plates bear areally against the mounting means and are sealed off against the mounting surface. The fixing is preferably realized by means of screws or by means of bolts and nuts.

To ensure a connection of the coolant feed lines to the injection nozzles, each nozzle inlet line is connected in terms of flow to an associated coolant feed line via an associated opening in the mounting means in the first flange plate. In this way, the mounting and fixing of the first flange plate on the mounting means of the injection device automatically results in each coolant feed line being correctly assigned to its associated injection nozzle. Installation errors are thus eliminated. In the case of a square or circular-ring-shaped design of flange plate and mounting surface, correct installation of the two components may furthermore be facilitated by virtue of one of the parts for example having a lug-like formation and the other component having a corresponding depression. It is however also conceivable for corresponding markings to be applied.

The regulating element preferably has a housing, wherein the mounting surface for the second flange plate is formed on an outer surface of the housing. This configuration makes it possible for the coolant feed lines to be installed rapidly, reliably and without error not only on the injection device but also on the regulating element. For this purpose, the housing of the regulating element is preferably of angular, for example square, rectangular or polygonal, cross-sectional form in the region of the mounting surface for the second flange plate.

The flange plates can thus be placed on areally and reliably sealed off.

The valve arrangement which is provided in the regulating element has a regulating cylinder which is arranged in the housing in the region of the mounting surface. Furthermore, the valve arrangement comprises a regulating cylinder which is arranged in the housing in the region of the mounting surface, wherein the regulating cylinder can be moved by means of a regulating spindle which projects, at the end side, out of the housing of the regulating element. It is thus possible for a drive, for example a motor, gear mechanism or actuating lever, to engage on the regulating spindle.

In one important embodiment, the regulating cylinder is provided with a longitudinal recess and with radial control openings which are connected in terms of flow to the connector for the coolant supply, wherein a control opening is provided for each injection nozzle of the injection device and the coolant feed line associated therewith. It is possible here for the injection nozzles of the injection device to be supplied singular with coolant individually via the coolant feed lines, which has an expedient effect on operational reliability. If one of the coolant feed lines fails owing to a fault, the remaining coolant feed lines remain unaffected by this. Furthermore, it is possible for each injection nozzle to be regulated in targeted fashion in order to obtain an optimum cooling action within the steam line.

One important embodiment of the invention provides that each control opening in the regulating cylinder is connected in terms of flow via an associated opening in the housing of the regulating element, and via a recess, associated with the respective opening, in the second flange plate, to the coolant feed line associated with the respective injection nozzle. Thus, the installation of the flange plates automatically results in correct assignment of the coolant feed line to the associated control openings, that is to say no installation errors arise.

The regulating cylinder is advantageously mounted so as to be rotatable about a longitudinal axis of the housing, wherein the opening cross section of each opening in the housing of the regulating element can be varied by means of a rotational movement of the regulating cylinder. Thus, no stroke movement takes place within the housing of the regulating element, which permits an extremely compact construction of the regulating element. The rotational movement rather provides that the size of the cross sections in the openings in the housing of the regulating element is varied by means of a purely tangential movement. This considerably lengthens the service life of the seals and guide elements within the regulating element. A further advantage of the rotational movement consists in that the control openings can open and close the respectively associated openings in the housing of the regulating element and thus the individual coolant feed lines in a virtually individual manner, such that an extremely uniform cooling water distribution can be achieved within the pipeline.

If required, the control openings may be of slot-shaped form at least in sections. Said control slots are situated on the circumference of the regulating cylinder so as to be offset with respect to one another and at different heights, such that the openings for the cooling water feed lines can are opened and closed in targeted fashion in succession and symmetrically with respect to one another.

To also enable multiple groups of cooling water feed lines to be connected to the regulating element, at least two mounting surfaces for the mounting of second flange plates are provided on the housing of said regulating element. It is however also possible here for three or more mounting surfaces to be provided, wherein the housing with three or four mounting surfaces is preferably of square form in cross section, whereas, in the case of five or more mounting surfaces, a pentagonal or hexagonal housing cross section is used. In any case, it is possible for one or more flange plates with coolant feed lines to be installed on virtually all side surfaces of the injection device. Here, each flange plate combines multiple coolant feed lines into a group, which groups in turn are provided as preassembled structural units.

If the first and second flange plates of the cooling water feed lines are of identical form, the handling and installation of the system is made even simpler because the flange plates can be installed both on the injection device and also on the regulating element.

In a further embodiment of the invention, the valve arrangement has a ball valve which is arranged between the regulating cylinder and the connector for the coolant supply. It may furthermore be expedient for a throttle device to be arranged between the regulating cylinder and the connector for the coolant supply.

Depending on cooling requirements, an injection cooler according to the invention may also have multiple (separate) injection devices that can be connected to the pipeline of the power plant. Here, the injection devices can be controlled by a common regulating element.

Further features, details and advantages of the invention will emerge from the wording of the claims and from the following description of exemplary embodiments on the basis of the drawings, in which:

FIG. 1a shows an injection cooler according to the invention in a pipeline with a regulating element and with a flange assembly provided in between;

FIG. 1b shows a sectional view of the injection device illustrated in FIG. 1a;

Figure 1A:
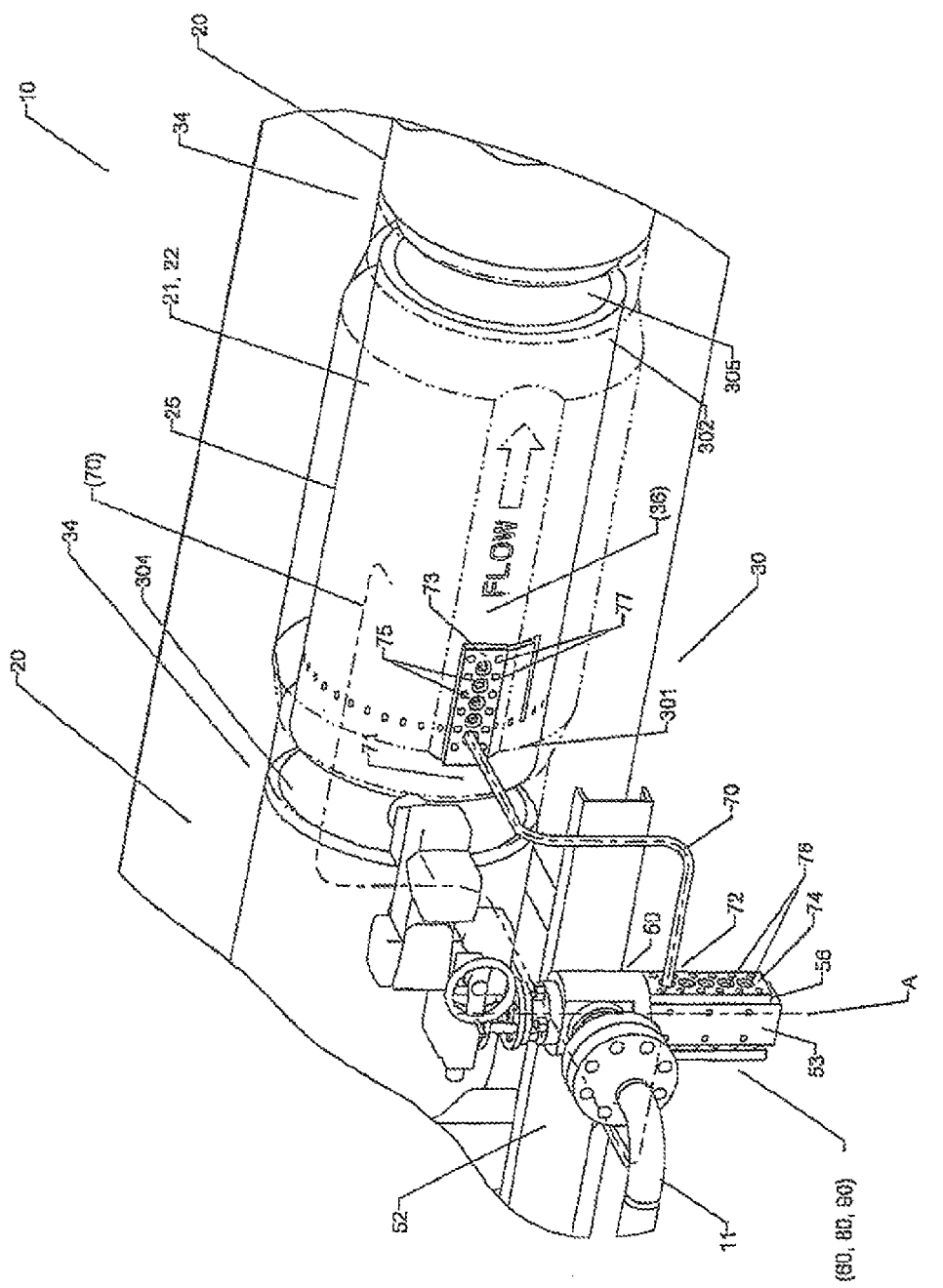

The injection cooler denoted as a whole by 10 in FIG. 1a is designed for use in a power plant (not shown in any more detail). Said injection cooler is intended for cooling hot steam, which is conducted in a pipeline 20 of the power plant, to a predefined temperature by virtue of a liquid coolant, for example water, being injected into the pipeline 20 or into the steam flow conducted therein.

For this purpose, the injection cooler 10 has an injection device 30 which has a tubular intermixing section 25 with injection nozzles 32, a regulating element 50 which is connected via a coolant connector 52 to a coolant supply 11, and multiple coolant feed lines 70 which connect the injection device 30 to the regulating element 50.

Figure 1B:
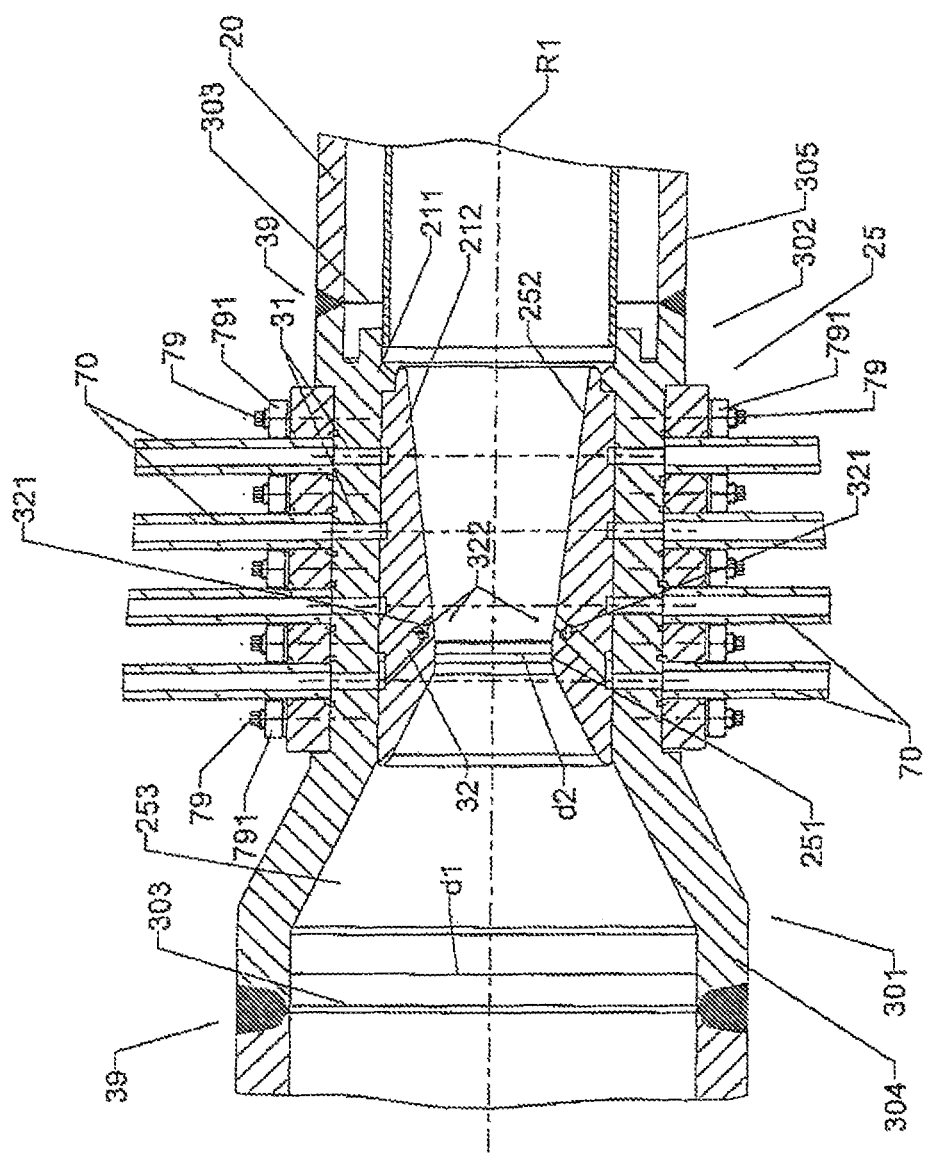

The intermixing section 25 has a connector 304, 305 on each of its ends 301, 302. Said intermixing section is connected by means of said connectors to the pipeline 20 of the power plant, wherein—as shown in FIG. 1a—a sleeve joint 34 is formed or—as illustrated in FIG. 1b—the connectors 304, 305 are connected in butt-jointed fashion to the pipeline ends of the pipeline 20, preferably by means of a welded connection 39. In any case, the intermixing section 25 forms a pipe segment 22 with a pipe wall 21 which is integrated in a sealed manner into the pipeline 20. Instead of the sleeve joint 34 or the welded connection 35, it is also possible for a flange connection (not illustrated), which is equipped with corresponding flange sections, to be provided between the intermixing section 25 and the pipeline 20.

Within the intermixing section 25, the injection device 30 has multiple radial injection nozzles 32 (not shown in FIG. 1a) which are distributed over the circumference and which inject the coolant within the pipe segment 22 substantially radially and in the flow direction R1 of the hot steam (in this regard, cf. FIG. 1b). The regulating element 50, which is connected by way of a flange connector 52 to the coolant supply 11, uses a valve and throttle arrangement 60, 80, 90 (in this regard, see FIG. 5) to regulate the flow rate and the pressure of the coolant to be injected into the pipeline 20 or into the steam flow.

Provided between the injection device 30 and the regulating element 50 are the coolant feed lines 70, of which however only one is shown in its entirety in FIG. 1a for better clarity.

Those ends 71 of the coolant feed lines 70 which are associated with the injection device 30 are fastened to a first flange plate 73, which can be fixed to a mounting surface 36 (not shown in any more detail in this illustration) of the injection device 30. The size of the mounting surface 36 and the size of the flange plate 73 are coordinated with one another such that the latter, by way of its support surface 78, lies flat on the mounting surface 36 over the full area thereof. For the fixing of the flange plate 73, threaded bores 361 are formed in the mounting surface 36 at the edges thereof, which threaded bores are arranged congruently with respect to bores 77 in the flange plate 73, such that said flange plate can be fixedly screwed to the injection device 30 and reliably sealed off.

It can be seen that, in the embodiment illustrated in FIG. 1a, the mounting surface 36 of the injection device 30 is provided on the pipe wall 21 of the intermixing section 25. Those ends 72 of the coolant feed lines 70 which are associated with the regulating element 50 are fastened to a second flange plate 74, which is fixed to a mounting surface 56 of the regulating element 50.

In the exemplary embodiment of FIGS. 1a and 1b, the two flange plates 73, 74 of the coolant feed lines 70 each have five bores 75, 76 for accommodating a total of five individual coolant feed lines 70. Said five coolant feed lines 70 together with the flange plates 73, 74 form a flange assembly B which can be produced inexpensively and which is easy to handle during the connection of the injection device 30 to the regulating element 50.

Depending on the number and arrangement of the injection nozzles 32 within the injection device 30, multiple flange assemblies B are provided. For this purpose, for example, two, three, four or more first flange plates 73 are fastened to the outer circumference of the pipe wall 21 of the intermixing section 25 at uniform or non-uniform intervals. Said pipe wall is for this purpose provided with the corresponding number of mounting surfaces 36, which are distributed over the circumference of the pipe wall 21. Corresponding to the number of flange assemblies B, it is also possible for one or more regulating elements 50 to be used, on each of which there are mounted two or three second flange plates. A central control unit (not illustrated) regulates the individual regulating elements 50 such that the injection nozzles 32 provided in the intermixing section 25 can be actuated singly and individually.

In the case of an even greater cooling demand, the injection cooler 10 may also have multiple injection devices 30 which are connected to the pipeline 20 of the power plant. Said injection devices 30, too, may for example be controlled by one or more common regulating elements 50. It is also conceivable for multiple injection coolers 10 according to the invention to be provided in the pipeline.

In the embodiment of FIG. 1b, two mounting surfaces 36 are arranged opposite one another on the outer circumference of the pipe wall 21 of the intermixing section 25. To fix the first flange plates 73 of the coolant feed lines 70 to the mounting surfaces 36 or to the mounting means 33, provision is made here, for example, of threaded bolts 79 to which the flange plates are fixed by means of nuts 791. Instead of threaded bolts 79 and nuts 791, use may also be made of screws (not illustrated) which engage into corresponding threaded bores.

It can also be seen in FIG. 1b that each coolant feed line 70 and the associated injection nozzle 32 are connected to one another by means of in each case one nozzle inlet line 31. Said nozzle inlet lines run within the pipe wall 21 of the pipe segment 22 or of the intermixing section 25 proceeding from the mounting surfaces 36, wherein the pipe wall 21 is, overall, of two-part form. A first wall section 211 forms the outer part of the pipe wall 21 and the connector 305 on the end 302 of the intermixing section 25. By contrast, a second wall section 212 forms the inner part of the pipe wall 21 and the connector 304 on the end 301 of the intermixing section 25. The two wall sections 211 are joined into one another and fixedly connected to one another in positively locking fashion, preferably welded to one another.

Formed between the wall sections 211, 212 are the nozzle inlet lines 31, wherein a first section (not designated in any more detail) of a nozzle inlet line 31 is formed as a radial bore in the first wall section 211, whereas a second section (likewise not designated in any more detail) is formed into the outer circumference of the second wall section 212. The two sections are connected to one another in terms of flow. They issue into the respectively associated injection nozzle 32, which is formed, as a nozzle bore, into the second wall section 212 at an angle obliquely with respect to the longitudinal axis L.

As the sectional view of FIG. 1b also shows, each injection nozzle 32 formed in the pipe wall 21 or in the second wall section 212 has, adjoining the nozzle bore, a conical or funnel-shaped end section 321 which issues into a nozzle opening 322. Owing to the oblique arrangement of the injection nozzles 32, the coolant is introduced into the intermixing section 25 substantially radially and in the flow direction R1, and is simultaneously atomized by the narrowed nozzle openings 322. Independently of this, the injection nozzles 32 are preferably arranged so as to be distributed uniformly over the circumference of the intermixing section 25, which furthermore has an expedient effect on the uniform distribution of the coolant in the steam flow.

It can be seen in FIG. 1b that the tubular intermixing section 25 forms, as a whole, a Laval nozzle, wherein the injection nozzles 32 are arranged in the region of a conical or funnel-shaped widening 252 of the intermixing section 25. A constriction 251 is provided in the intermixing section 25 upstream of the widening 252, which constriction widens again—counter to the flow direction R1—in a further conical or funnel-shaped section 253. The conical or funnel-shaped widening 252 and the constriction 251 are formed in the second wall section 212, whereas the further conical or funnel-shaped section 253 is formed both by the first and also by the second wall section 211, 212. By means of the constriction 251, the inner diameter of the tubular intermixing section 25 is initially narrowed from a first diameter d1 at the first end 304 to a second diameter d2, before then widening again to a greater diameter toward the second end 302.

The Laval-nozzle-like configuration of the intermixing section 25 yields a flow profile which ensures that the coolant that is introduced into the steam flow via the injection nozzles 32 is distributed rapidly and uniformly over the entire pipe cross section. At the same time, the coolant that is introduced is additionally atomized in the intermixing section 25, whereby very small droplet sizes of the coolant are obtained. All of this ensures extremely efficient and uniform cooling of the hot steam by means of the finely distributed coolant.

Each injection nozzle 32 is connected via the nozzle inlet line 31 associated therewith to a likewise associated coolant feed line 70, which coolant feed lines are connected to the regulating element 50 by means of the second flange plates 74. The housing 51 of said regulating element 50 is provided with corresponding mounting surfaces 56 for the second flange plates 74. Depending on requirements and the available space, the number of coolant feed lines 70 fastened to the flange plates 73, 74 may vary. It is always important that the coolant feed lines 70 and the associated flange plates 73, 74 form a prefabricated flange assembly B in order that the coolant feed lines 70 do not all have to be connected individually, and that cooling water can be introduced into the hot steam conducted in the pipeline 20 as required by means of each injection nozzle 32 and the respectively associated coolant feed line 70.

Accordingly, a separate coolant feed line 70 is provided for each injection nozzle 32 of the injection device 30. It can also be seen that, by virtue of the coolant feed lines 70 being formed as flange assemblies B, the regulating element 50 can be arranged with a defined spacing to the injection cylinder 30, and thus outside the hot steam line 20, which in modern power plants is often at temperatures of greater than 600° C. In this way, no moving parts are situated within the extremely hot line region, which has an extremely advantageous effect on the service life of the injection device 30 and of the regulating element 50. Furthermore, the installation outlay for the cooling water feed lines 70 is reduced to a minimum because these can, as flange assemblies B, be installed on the injection device 30 and on the regulating element 50 in a rapid and convenient manner. Furthermore, individual components of the injection cooler 10 can be exchanged in a rapid and convenient manner because, owing to the simple installation and dismounting of the flange plates 73, 74, it is also possible for the regulating element 50 to be exchanged, or installed and dismounted for repair purposes, in a rapid and economical manner.

Figure 2:
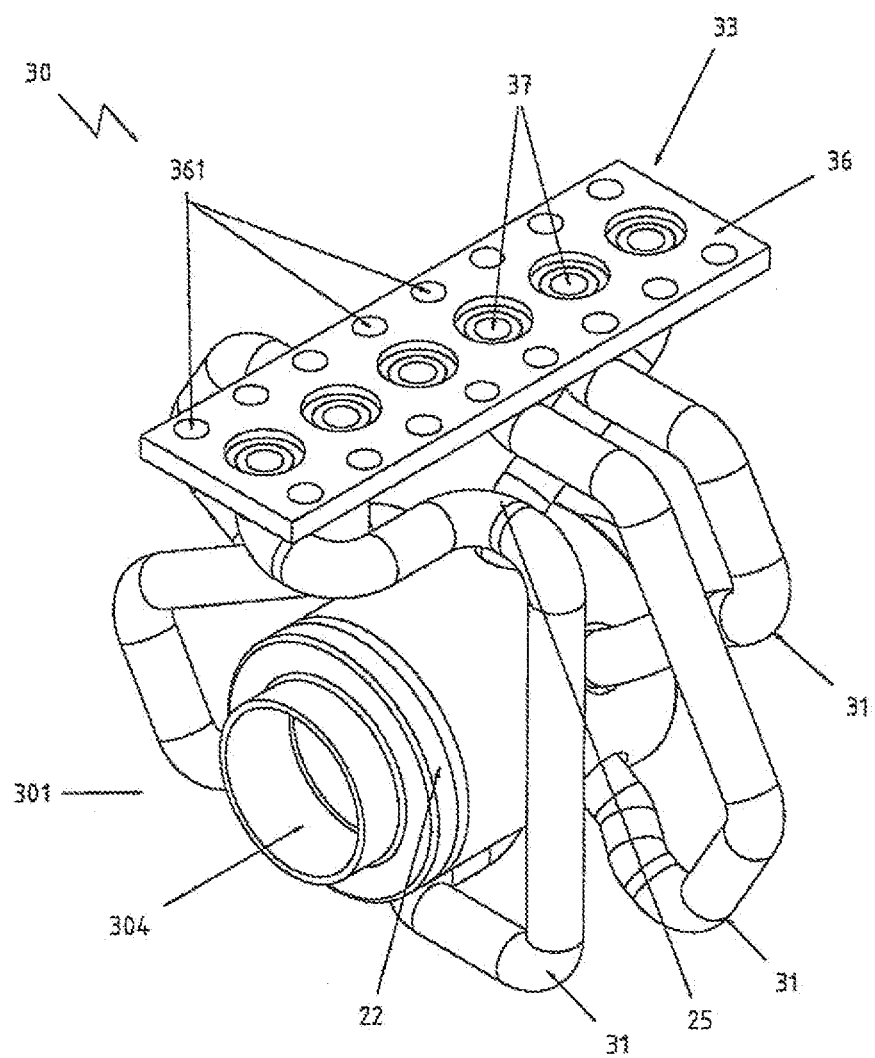
FIG. 2 shows a different injection device of an injection cooler according to the invention.
Figure 3:
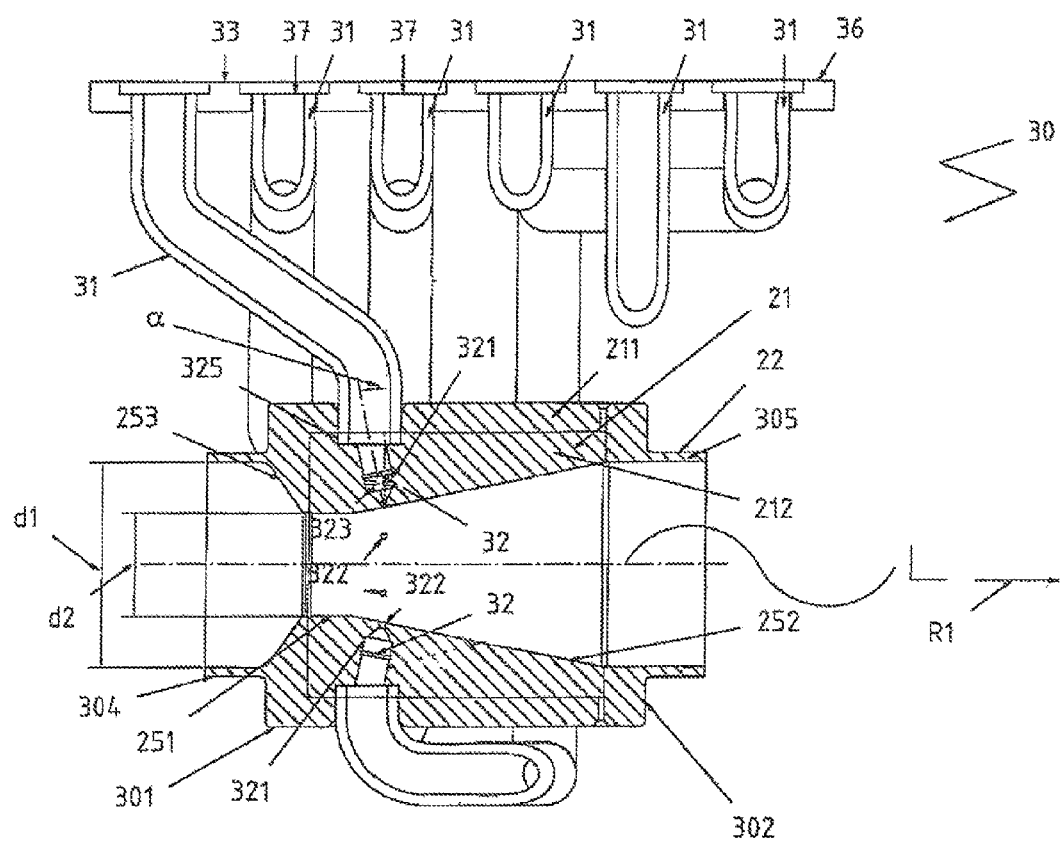
FIG. 3 shows a sectional view of the injection device shown in FIG. 2.

FIGS. 2 and 3 show another embodiment of an injection device 30 of an injection cooler 10 according to the invention, wherein identical components are denoted in each case by the same reference signs.

The injection device 30 shown here has a mounting means 33 arranged spaced apart from the intermixing section 25, which mounting means bears the mounting surface 36 for the flange plates 73 of the coolant feed lines 70. It is consequently possible for in each case one first flange plate 73 to be fixed to the mounting surface 36. In the mounting means 33 there are provided a total of six openings 37 which are each connected to a nozzle inlet line 31. The coolant can be fed from the coolant feed lines 70 to the respective injection nozzles 32 through said nozzle inlet lines.

The number and arrangement of the openings 37 in the mounting surfaces 36 correspond—as in the exemplary embodiment of FIGS. 1a and 1b—to the number and arrangement of the recesses 75 in the respectively associated flange plate 73 and thus to the number of coolant feed lines 70 that are provided in the flange plate 73. When said flange plate, in the intended state, lies by way of its support surface 78 on the associated mounting surface 36 of the mounting means 33, the openings 37 and the recesses 75 in the flange plate 73 are situated congruently one above the other, such that the coolant can flow unhindered from the coolant feed line 70 into the respectively associated nozzle inlet line 31.

The mounting means 33 is preferably a flange plate 33. The size thereof and the size of the flange plate 73 are coordinated with one another such that the latter, by way of its support surface 78, lies flat on the mounting surface 36 over the full area thereof. For the fixing of the flange plate 73, threaded bores 361 are formed in the flange plate 33 at the edges thereof, which threaded bores are arranged congruently with respect to bores 77 in the flange plate 73, such that the latter can be fixedly screwed to the injection device 30 in a sealed manner.

The injection device 30 also has a tubular intermixing section 25 which is provided with a neck section 304, 305 at each of its ends 301, 302. Said neck section forms, for example, a part of a pipe sleeve joint 34 which connects the intermixing section 25 to the pipeline 20 of the power plant.

The intermixing section 25 thus forms a pipe segment 22 of the pipeline 20, and the injection cooler is integrated in a sealed manner into the pipeline 20. Instead of the pipe sleeve joint 34, it is also possible for a flange connection (not illustrated) to be provided between the intermixing section 25 and the pipeline 20, which flange connection is equipped with corresponding flange sections, or a butt-jointed connection, which is welded.

It can be seen in the sectional illustration of FIG. 3 that it is also the case here that each coolant feed line 70 and the associated injection nozzle 32 are connected to one another via a respective nozzle inlet line 31. Said nozzle inlet lines however do not run within the pipe wall 21 of the intermixing section 25, and are instead in the form of separate pipe sections outside the pipe wall 21. Said pipe wall is of two-part overall form in this case too. A first wall section 211 forms the outer part of the pipe wall 21 and the connector 305 on the end 302 of the intermixing section 25. A second wall section 212 forms the inner part of the pipe wall 21 and the connector 304 on the end 301 of the intermixing section 25. The two wall sections 211 are joined into one another in positively locking fashion and are fixedly connected to one another, preferably welded to one another. The connectors 304, 305 form projecting neck sections that may be part of a sleeve joint 34.

Each nozzle inlet line 31, as a separate pipe section, adjoins the respectively associated flange plate 33 and opens out in the first wall section 211, which is provided with a corresponding receiving opening (not shown in any more detail). Said receiving openings are connected in terms of flow to duct sections 325 which are formed into the outer circumference of the second wall section 212 and which issue into the respectively associated injection nozzles 32 which are formed, as nozzle bores, into the second wall section 212 at an angle α obliquely with respect to the longitudinal axis L.

As is also shown in the sectional illustration of FIG. 3, each injection nozzle 32 formed in the pipe wall 21 or in the second wall section 212 has, adjoining the nozzle bore, a conical or funnel-shaped end section 321 which issues into a nozzle opening 322. Owing to the oblique arrangement of the injection nozzles 32, the coolant is introduced into the intermixing section 25 substantially radially and in the flow direction R1, and is simultaneously atomized by the narrowed nozzle openings 322. Independently of this, the injection nozzles 32 are preferably arranged so as to be distributed uniformly over the circumference of the intermixing section 25, which furthermore has an expedient effect on the uniform distribution of the coolant in the steam flow.

It can be seen here, too, that the pipe inner surface of the intermixing section 25 of the injection device 30 forms, as a whole, a Laval nozzle, wherein the injection nozzles 32 are arranged in the region of the conical or funnel-shaped widening 252 of the intermixing section 25. Upstream of the widening 252 there is provided the constriction 251 which widens—counter to the flow direction R1—in the further conical or funnel-shaped section 253. The constriction 251 has the effect that the inner diameter of the tubular intermixing section 25 initially narrows from a first diameter d1 in the neck section 304 to a second diameter d2, before subsequently widening again to the diameter d1.

Said Laval-nozzle-like configuration of the intermixing section 25 yields a flow profile which ensures that the coolant introduced via the injection nozzles 32 into the steam flow is distributed rapidly and uniformly over the entire pipe cross section. At the same time, the coolant that is introduced is additionally atomized in the intermixing section 25, whereby very small droplet sizes of the coolant are achieved. All of this ensures extremely efficient and uniform cooling of the hot steam by means of the finely distributed coolant.

It is also the case here that each injection nozzle 32 has, following the nozzle bore in the second wall section 212, a conical or funnel-shaped end section 321 which issues into a nozzle opening 322. In this way, the coolant is introduced into the intermixing section 25 substantially radially and in the flow direction R1, and is optimally atomized by the narrowed nozzle openings 322. Said nozzle openings are arranged so as to be uniformly distributed over the circumference of the intermixing section 25, which furthermore has an expedient effect on the uniform distribution of the coolant in the steam flow.

In the embodiment of FIG. 3, a swirl or mixing insert 323 is arranged upstream of the conical or funnel-shaped end section 321 of the injection nozzle 32, which swirl or mixing insert causes turbulence in and intermixing of the coolant already within the nozzle bore, which has an extremely advantageous effect on the distribution of the cooling water within the intermixing section 25.

Figure 4:
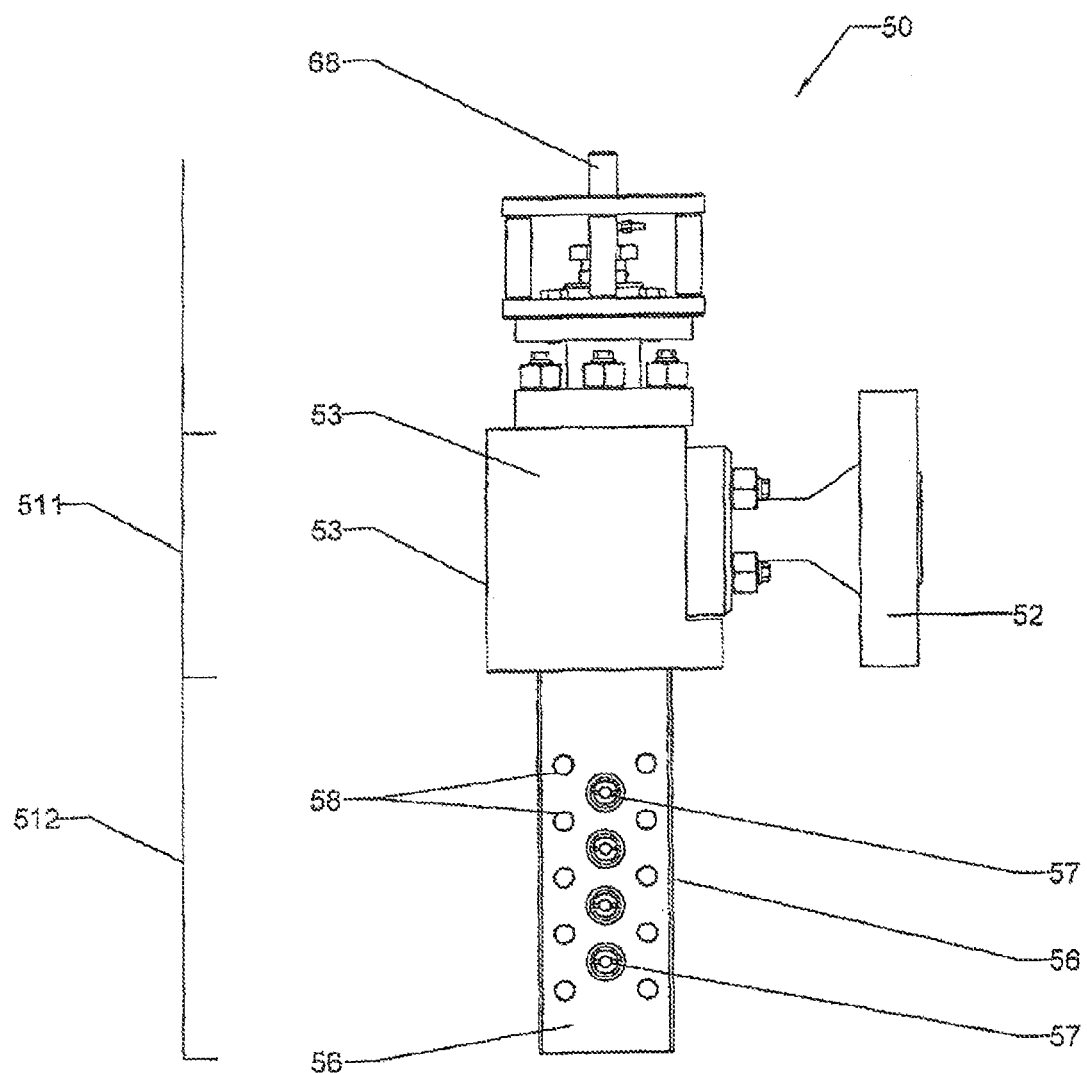
FIG. 4 shows a side view of a regulating element of an injection cooler according to the invention.

FIG. 4 shows the regulating element 50 with its housing 51, which in a first section 511 facing toward the coolant connector 52 is of substantially cylindrical form, whereas a second section 512 facing toward the flange assembly B is of square cross-sectional form, wherein the outer surface 53 of the housing 51 forms four planar side surfaces 56 in the region of the second section 512. Said side surfaces serve as mounting surfaces for the second flange plates 74 of the flange assembly B. The size of the mounting surfaces 56 and the size of the flange plates 74 are coordinated with one another such that the latter, by way of their support surfaces 78, lie flat on the mounting surfaces 56 over the full area thereof. For the fixing of the flange plates 74, threaded bores 58 are formed into the mounting surfaces 56 at the edges, which threaded bores are arranged congruently with respect to the bores 77 in the flange plates 74, such that said flange plates can be fixedly screwed to the housing 51 of the regulating element 50.

As is also shown in FIG. 4, openings 57 are formed into the mounting surfaces 56 of the housing 51, through which openings the coolant can flow out of the regulating element 50. The number and arrangement of the openings 57 in a mounting surface 56 corresponds to the number and arrangement of the recesses 76 in the respectively associated flange plate 74, and thus to the number of coolant feed lines 70 provided on the flange plate 74. When said flange plate, in the intended state, lies by way of its support surface 78 on the associated mounting surface 56 of the housing 51, the openings 57 and the recesses 76 in the flange plate 74 are situated congruently one above the other, such that the coolant can flow unhindered from the regulating element 50 into the coolant feed lines 70. It is possible for the same number of openings 57 and recesses 76 to be provided in each of the mounting surfaces 56 and flange plates 74. It is however also possible for a different number of openings 57 and recesses 76 to be provided in the various surfaces.

Figure 5:
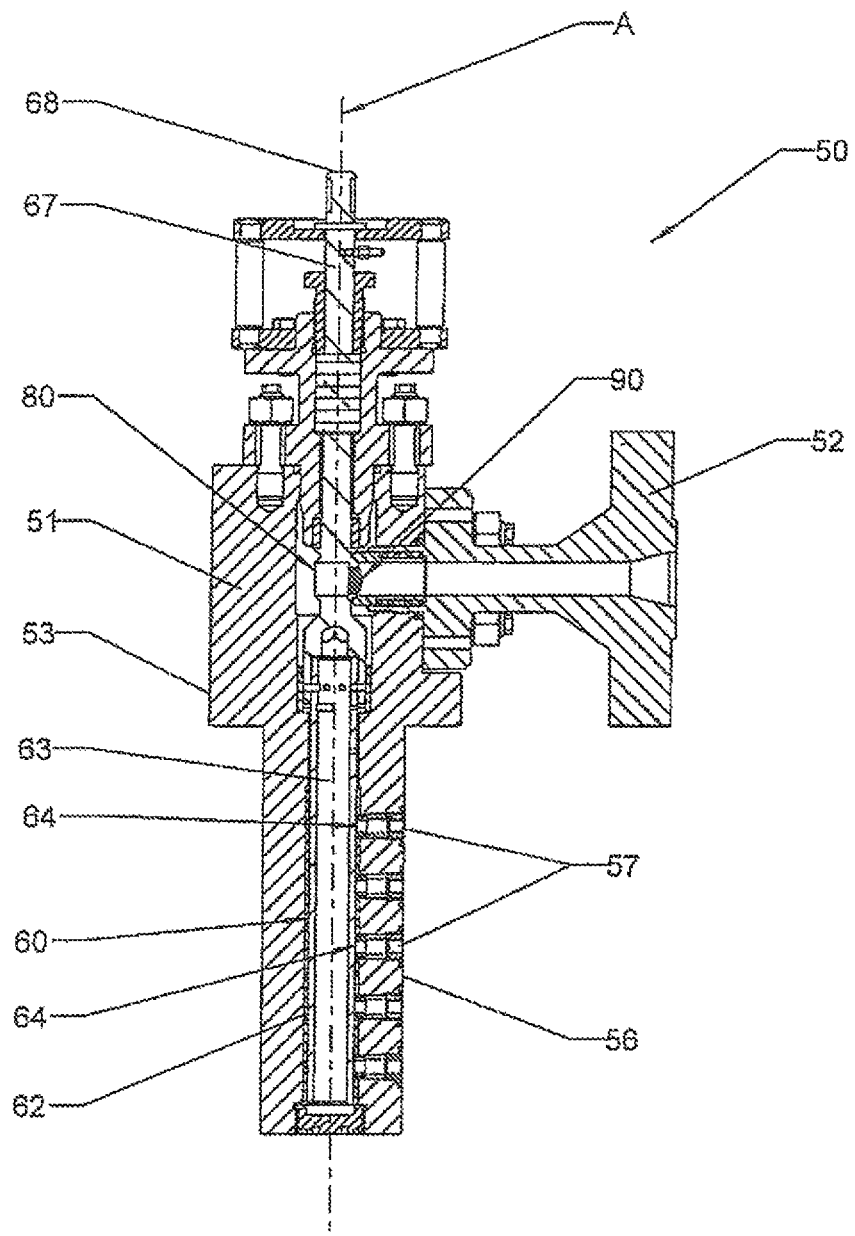
FIG. 5 shows a sectional view of the regulating element shown in FIG. 4.

As illustrated in FIG. 5, the openings 57 issue, within the housing 51, into a substantially cylindrical cavity in which a valve arrangement 60 is formed. Said valve arrangement comprises, in the region of the mounting surfaces 56 for the flange plates 74, a regulating cylinder 62 which is mounted such that it can be rotated about the longitudinal axis A of the regulating element 50 by means of a regulating spindle 67. The regulating spindle 67 is mounted in a bearing sleeve (not shown in any more detail) with stuffing box packing. Said regulating spindle projects, by way of an end 68, out of the end of the housing 51 of the regulating element 50 and is connected there to an actuating drive (not illustrated in any more detail) which may operate mechanically, hydraulically, pneumatically or electrically.

The regulating cylinder 62 has a central longitudinal recess 63 which, within the housing 51, is connected in terms of flow to the connector 52 for the coolant supply and which is provided, on the circumference, with radial control openings 64, wherein one control opening 64 is provided for each opening 57 and for each injection nozzle 32 of the injection device 30, and consequently for each associated coolant feed line 70.

When the regulating cylinder 62 is placed, by means of the regulating spindle 67, into a certain angular position relative to the housing 51, selected control openings 64 in the regulating cylinder 62 are connected in terms of flow to the respectively associated coolant feed lines 70 via the respectively associated openings 57 in the housing 51 of the regulating element 50 and via the recesses 76, associated with the respective openings 57, in the second flange plate 74 of the flange assembly B, such that the cooling water can flow from the regulating element 50 via the open coolant feed lines 70 into the nozzle inlet lines 31, associated with the injection cylinder 30, in order to be able to flow from there through the respectively associated injection nozzles 32 into the intermixing section 25 or the pipeline 20. The opening cross section of each opening 57 in the housing 50 of the regulating element 50 can in this case be varied by means of the rotational movement of the regulating cylinder 62 about the axis A, such that the respectively associated coolant feed line 70 can be opened up, and the coolant flow regulated. It is preferable for the control openings 64 to be of slot-shaped form at least in sections. Said control openings may however also be of circular or oval form.

Depending on the number of injection nozzles 32, the regulating element 50 has at least one, preferably at least two to four, mounting surfaces 56 for the second flange plates 74 of the flange assembly B. It is however also possible for the second section 512 of the housing 51 to be of pentagonal or hexagonal form in order thereby to be able to connect five or more flange assemblies B to the regulating element 50.

In addition to the regulating cylinder 62, the valve arrangement 60 has, in the region of the first housing section 511, a ball valve 80. By means of said ball valve, the coolant flow from the connector 52 into the housing 51 can additionally be completely shut off when required. The ball valve 80 is preferably arranged between the regulating cylinder 62 and the connector 52 for the coolant supply. Here, it is also possible for a throttle device 90 to be provided which regulates the pressure of the coolant flowing into the regulating element 50 from the connector 52, in order for example to be able to control relatively large pressure differences.

Figure 6:
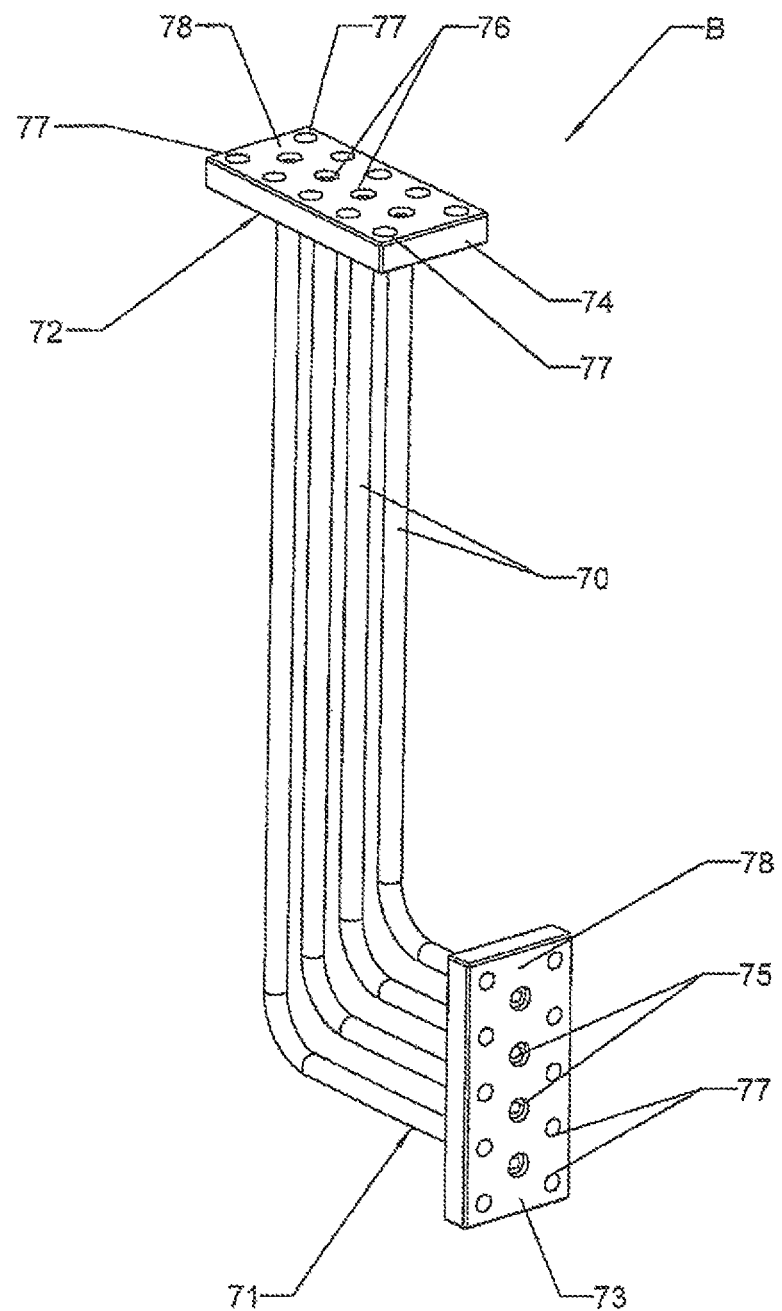
FIG. 6 shows coolant feed lines, as a flange assembly, provided between a regulating element and an injection device of an injection cooler according to the invention.

FIG. 6 illustrates coolant feed lines 70 provided between a regulating element 50 and an injection device 30 of an injection cooler 10 according to the invention, and the two associated flange plates 73, 74. The coolant feed lines 70 and the common flange plates 73, 74 form a flange assembly B.

In the flange plates 73, 74 there are provided recesses 75, 76 which are connected in terms of flow, in each case in pairs, to an associated coolant feed line 70, such that the coolant can flow unhindered through the flange plates 73, 74 and the coolant feed lines 70. The recesses 75, 76 are arranged linearly in a row, wherein the coolant feed lines 70—where possible—run parallel to and with a constant spacing from one another. This ensures a simple geometry both of the injection device 30 and also of the regulating element 50, which can be of narrow overall form transversely with respect to their longitudinal axes A. It is however also possible if required for the recesses 75, 76 and the coolant feed lines 70 to be provided in some other arrangement, for example offset or obliquely adjacent one another or in the form of a matrix.

Bores 77 for receiving screws are formed in each flange plate 73, 74 at the edges, such that the flange plates 73, 74 can be fixedly screwed to the injection device 30 and to the regulating element 50. In this way, each coolant feed line 70 which is connected to a flange plate 73 and which is installed on the mounting surface of the injection device by means of said flange plate 73 is firmly associated with preferably one injection nozzle 32. Said injection nozzles are supplied with coolant individually and singly via the nozzle inlet lines 31 of the injection device 30, wherein assembly errors are not possible owing to the unequivocal associations. At the same time, however, each injection nozzle 32 of the injection device 30 is connected to a separate coolant feed line 70, such that the injection nozzles 32 can be actuated singly by means of the regulating element 50 and supplied individually with coolant.

With the injection cooler 10 according to the invention, it is possible for pressure differences between the cooling water and hot steam to be regulated with extremely fine atomization of the cooling water, wherein immediate and complete mixing of the cooling medium with the steam flow is realized. Depending on the temperature of the hot steam flowing in the pipeline 20, the regulating spindle 67 is pivoted within the housing 51 by means of the drive (not illustrated) such that a tangential movement of the control openings 64 takes place. Corresponding to said movement, different control cross sections of the control openings 64 relative to the openings 57 in the housing 51 and the recesses 76 in the second flange plates 74 of the flange assemblies B are opened up, whereby the cooling water can flow into the respectively open coolant feed lines 70 and via the first flange plates 73 into the injection device 30.

The invention is not restricted to one of the above-described embodiments, and may be modified in a variety of ways. It is evident that, in the case of an injection cooler 10 for cooling hot steam conducted in a pipeline 20, having an injection device 30 which is connected to the pipeline 20 and which has multiple injection nozzles 32, having a regulating element 50 that can be connected by way of a connector 52 to a coolant supply 11, wherein, in the regulating element 50, there is arranged a valve arrangement 60 by means of which the coolant feed to the injection nozzles 32 of the injection device 30 can be regulated, and having coolant feed lines 70 that are provided between the injection device 30 and the regulating element 50, wherein a separate coolant feed line 70 is provided for each injection nozzle 32, the invention provides that those ends 71 of the coolant feed lines 70 that are associated with the injection device 30 are fastened to a common first flange plate 73 which can be fixed to a mounting surface 36 on the injection device 30, and that those ends 72 of the coolant feed lines 70 that are associated with the regulating element 50 are fastened to a common second flange plate 74 which can be fixed to a mounting surface 56 of the regulating element 50, and that the injection device 30 has a tubular intermixing section 25 which is connected to the pipeline 20, and that the intermixing section 25 has a narrowing 251 and has a widening 252 arranged downstream of the narrowing 251 in the flow direction R1, wherein the coolant feed lines 70 and the flange plates 73, 74 form a flange assembly B which can be installed between the injection cooler 30 and the regulating element 50.

It is also evident that the intermixing section 25 of the injection device 30 forms, overall, a Laval nozzle, wherein the injection nozzles 32 are arranged in the region of a conical or funnel-shaped widening 252 of the intermixing section 25.

All of the features and advantages, including structural details, spatial arrangements and method steps, that emerge from the claims, from the description and from the drawing may be essential to the invention both individually and also in a wide variety of combinations.

LIST OF REFERENCE SIGNS

A Longitudinal axis
B Flange assembly
L Longitudinal axis
R1 Flow direction
d1 First diameter
d2 Second diameter
α Angle
10 Injection cooler
11 Coolant supply
20 Pipeline
21 Pipe wall
211 First wall section
212 Second wall section
22 Pipe segment
25 Intermixing section
251 Constriction
252 Widening
253 Further section
30 Injection device
301 End
302 End
304 Connector
305 Connector
31 Nozzle inlet line
32 Injection nozzles
321 End section
322 Nozzle opening
323 Swirl or mixing insert
325 Duct section
33 Mounting means/flange plate
34 Sleeve joint
36 Mounting surface
361 Threaded bore
37 Opening
39 Welded connection
50 Regulating element
51 Housing
511 First section
512 Second section
52 Connector
53 Outer surface
56 Mounting surface
79 Threaded bolt
791 Nut
57 Opening
58 Threaded bores
60 Valve arrangement
62 Regulating cylinder
63 Longitudinal recess
64 Control opening
67 Regulating spindle
68 End
70 Coolant feed line
71 End
72 End
73 First flange plate
74 Second flange plate
75 Bore
76 Bore
77 Bore
78 Support surfaces
80 Ball valve
90 Throttle device

The invention claimed is:

1. An injection cooler (10) for cooling hot steam conducted in a flow direction (R1) in a pipeline (20),
a) having an injection device (30) which can be connected to the pipeline (20) and which has multiple injection nozzles (32),
b) having a regulating element (50) that can be connected by way of a connector (52) to a coolant supply,
c) wherein, in the regulating element (50), there is arranged a valve arrangement (60) by means of which the coolant feed to the injection nozzles (32) of the injection device (30) can be regulated, and
d) having coolant feed lines (70) that are provided between the injection device (30) and the regulating element (50),
e) wherein a separate coolant feed line (70) is provided for each injection nozzle (32),
characterized
f) in that those ends (71) of the coolant feed lines (70) that are associated with the injection device (30) are fastened to a common first flange plate (73) which can be fixed to a mounting surface (36) on the injection device (30), and
g) in that those ends (72) of the coolant feed lines (70) that are associated with the regulating element (50) are fastened to a common second flange plate (74) which can be fixed to a mounting surface (56) of the regulating element (50),
h) in that the injection device (30) has a tubular intermixing section (25) which can be connected to the pipeline (20), wherein the intermixing section (25) has a Laval-nozzle-like longitudinal section along a longitudinal axis (L), and
i) wherein the injection nozzles (32) are arranged in the region of a conical or funnel-shaped widening (252) of the intermixing section (25), wherein upstream of the widening (252, a constriction (251) is provided, which widens in a further conical or funnel-shaped section (253), the coolant is introduced into the intermixing section (25) substantially radially and in the flow direction R1, and a swirl or mixing insert (323) is arranged upstream of a nozzle opening in each injection nozzle (32); and further wherein the regulating element (50) has a housing (51), wherein the mounting surface (56) for the common second flange plate (74) is formed on an outer surface (53) of the housing (51), the valve arrangement (60) having a regulating cylinder (62), the regulating cylinder (62) having radial control openings, each radial control opening (64) connected in terms of flow via an associated opening (57) in the housing (51) of the regulating element (50), and via a recess (76) in the common second flange plate (74) and associated with the respective opening (57), to the coolant feed line (70) associated with the respective injection nozzle (32).

2. The injection cooler (10) as claimed in claim 1, characterized in that the injection nozzles (32) are arranged in the intermixing section (25).

3. The injection cooler (10) as claimed in claim 1, characterized in that the injection device (30) comprises multiple nozzle inlet lines (31) which are each connected to an associated injection nozzle (32).

4. The injection cooler (10) as claimed in claim 1, characterized in that each injection nozzle (32) has a nozzle opening (321), which nozzle opening is arranged such that the coolant can be introduced into the intermixing section (25) substantially radially and in the flow direction (R1).

5. The injection cooler (10) as claimed in claim 1, characterized in that the injection nozzles (32) and/or the associated nozzle inlet line (31) are arranged, at least in sections, in a wall (21) of the intermixing section (25).

6. The injection cooler (10) as claimed in claim 1, characterized in that at least two injection nozzles (32) are arranged, spaced apart from one another in the circumferential direction, on or in the intermixing section (25).

7. The injection cooler (10) as claimed in claim 1, characterized in that the injection device (30) has a mounting means (33) on which the support surface (36) for the first flange plate (73) is formed.

8. The injection cooler (10) as claimed in claim 7, characterized in that each nozzle inlet line (31) is connected in terms of flow to an associated coolant feed line (70) via an associated opening (37) in the mounting means (33) in the first flange plate (73).

9. The injection cooler (10) as claimed in claim 1, characterized in that the regulating cylinder (62) is arranged in the housing (51) a region of the mounting surface (56), the regulating cylinder (62) being provided with a longitudinal recess (63) containing the radial openings (64).

10. The injection cooler as claimed in claim 1, characterized in that the regulating cylinder (62) is mounted so as to be rotatable about a longitudinal axis (A) of the housing (51), wherein the opening cross section of each opening (57) in the housing (50) of the regulating element (50) can be varied by means of a rotational movement of the regulating cylinder (62).

\* \* \* \* \*